United States Patent
Rand McFadden et al.

(10) Patent No.: US 7,958,200 B2
(45) Date of Patent: Jun. 7, 2011

(54) METHODS, COMPUTER PROGRAM PRODUCTS, AND APPARATUSES FOR PROVIDING REMOTE CLIENT ACCESS TO EXPORTED FILE SYSTEMS

(75) Inventors: Renata Rand McFadden, Clinton Corners, NY (US); David A. Wise, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/838,311

(22) Filed: Aug. 14, 2007

(65) Prior Publication Data
US 2009/0049153 A1    Feb. 19, 2009

(51) Int. Cl.
G06F 15/16    (2006.01)
G06F 15/173    (2006.01)

(52) U.S. Cl. .... 709/217; 709/225; 709/226; 707/E17.01

(58) Field of Classification Search .................. 709/217
See application file for complete search history.

(56) References Cited

U.S. PATENT DOCUMENTS

| | | | | |
|---|---|---|---|---|
| 5,175,851 | A | * | 12/1992 | Johnson et al. .................. 707/8 |
| 5,416,921 | A | | 5/1995 | Frey et al. |
| 5,454,108 | A | * | 9/1995 | Devarakonda et al. ....... 718/104 |
| 5,537,574 | A | | 7/1996 | Elko et al. |
| 5,634,122 | A | * | 5/1997 | Loucks et al. .................. 707/8 |
| 5,758,334 | A | * | 5/1998 | Knight et al. .................. 707/2 |
| 6,031,978 | A | | 2/2000 | Cotner et al. |
| 6,078,929 | A | * | 6/2000 | Rao .............................. 707/200 |
| 6,192,408 | B1 | * | 2/2001 | Vahalia et al. ................ 709/229 |
| 6,275,953 | B1 | * | 8/2001 | Vahalia et al. .................. 714/11 |
| 6,385,701 | B1 | * | 5/2002 | Krein et al. .................... 711/141 |
| 6,489,954 | B1 | | 12/2002 | Powlette |
| 6,622,177 | B1 | | 9/2003 | Eilert et al. |
| 6,828,716 | B2 | | 12/2004 | Kang |
| 7,058,696 | B1 | * | 6/2006 | Phillips et al. ................ 709/217 |
| 7,519,596 | B2 | * | 4/2009 | Iyer et al. .......................... 707/9 |
| 2002/0026560 | A1 | * | 2/2002 | Jordan et al. .................. 711/120 |
| 2002/0104080 | A1 | | 8/2002 | Woodard et al. |

(Continued)

OTHER PUBLICATIONS

Peter J. Braam & Philip A. Nelson, Removing Bottlenecks in Distributed Filesystems Coda & InterMezzo as examples (1999) http://www-2.cs.cmu.edu/afs/cs/project/coda-www/ResearchWebPages/docdir/linuxexpo99.pdf.*

(Continued)

*Primary Examiner* — Shawki S Ismail
*Assistant Examiner* — Robert Shaw
(74) *Attorney, Agent, or Firm* — Cantor Colburn LLP; William Kinnaman (57) ABSTRACT

Remote clients may access remotely exported file systems using a remote token manager that provides communication among a plurality of caching file servers. In response to a client request for file system access, a program is invoked to determine whether the request relates to a locally exported file system exported by a local caching file server or a remotely exported file system exported by a remote caching file server. If the request relates to a locally exported file system, a local token manager is invoked to obtain a token granting access permission to the locally exported file system. If the request relates to a remotely exported file system, a remote token manager is invoked to communicate with a local access routine in the remote caching file server to obtain a token granting access permission for the remotely exported file system.

13 Claims, 6 Drawing Sheets

U.S. PATENT DOCUMENTS

| | | | |
|---|---|---|---|
| 2003/0115218 A1 | 6/2003 | Bobbitt et al. | |
| 2003/0187883 A1* | 10/2003 | Zelenka et al. | 707/201 |
| 2003/0200436 A1* | 10/2003 | Eun et al. | 713/172 |
| 2004/0054777 A1* | 3/2004 | Ackaouy et al. | 709/225 |
| 2004/0064434 A1* | 4/2004 | Sampson | 707/1 |
| 2004/0255048 A1* | 12/2004 | Lev Ran et al. | 709/249 |
| 2005/0091448 A1* | 4/2005 | Nakatani et al. | 711/113 |
| 2006/0123062 A1* | 6/2006 | Bobbitt et al. | 707/200 |
| 2007/0022087 A1* | 1/2007 | Bahar et al. | 707/1 |
| 2007/0162564 A1* | 7/2007 | Williams et al. | 709/219 |

OTHER PUBLICATIONS

Dahlin et al. Cooperative Caching: Using Remote Client Memory to Improve File System Performance, Proc. of 1st Symp. on Operating Systems Design and Implementation, pp. 1-14, 1994 http://www.usenix.org/publications/library/proceedings/osdi/full_papers/dahlin.a.*

Rogers et al, "OS/390 Version 2 Release 10 Implementation", IBM RedBooks SG24-5976-00, Mar. 2001, pp. 1-226, IBM : International Technical Support Organization.

* cited by examiner

METHODS, COMPUTER PROGRAM PRODUCTS, AND APPARATUSES FOR PROVIDING REMOTE CLIENT ACCESS TO EXPORTED FILE SYSTEMS

BACKGROUND

The present disclosure relates generally to file access, and, in particular, to methods, computer program products, and apparatuses for providing remote client access to exported file systems in a distributed computing environment.

In a generalized computing environment, applications may access stored data via a set of operating system services including a file system. A file system includes a set of stored files and program tools for maintaining the set of files. File systems that control the physical representation of objects, such directories and files, are known as physical file systems (PFSs). Also included in a generalized computing environment is a kernel that performs basic functions, such as allocating hardware. The kernel is a central part of many computer operating systems and manages the system's resources and the communication between hardware and software components. As a basic component of an operating system, a kernel provides abstraction layers for hardware that allow hardware and software to communicate.

A logical file system (LFS) is the level of the file system at which users can request file operations using a system call. The LFS provides the kernel with a consistent view of what may be multiple physical file systems and multiple file system implementations. A consistent view of file system implementation is made possible by a virtual file system (VFS). This virtual file system is an abstraction of a physical file system implementation. It provides a consistent interface to multiple file systems, both local and remote. The interface allows the LFS code in the kernel to operate without regard to the type of file system being accessed. Each time a file is opened or made accessible, the file system creates a data structure, known as a "vnode", which is chained to the VFS. A vnode is an abstract representation of an active file and provides a generic way to operate on the real file it represents, regardless of the file system it resides on.

In a distributed computing environment, a number of computing systems are operatively coupled to a communication network and can share files by way of a distributed file system. An example of a distributed computing system is a server-client system in which one or more remote client devices are serviced by one or more server devices. The server devices control access by the client devices to storage devices containing file system data. A file exporter running on the server provides data to remote clients which are operatively coupled to the file exporter. Access for locally exported file system data may be referred to as local access, while access for remotely exported file system data may be referred to as remote access. When a file server obtains data to fulfill a remote client's request for data, a cache manager process in the kernel of the file server caches a copy of the data. As long as the data does not change, the locally cached copy remains available to the remote client. A new copy is retrieved only when another process changes the cached data.

In addition to remote clients, which are external to but connected to the distributed file system, there are applications which are executed using a file system in the distributed computing environment. Data requests by applications are handled differently from requests from remote clients. To understand how data requests from applications are handled, consider a sysplex, which is a system of computer mainframes acting together as a distributed file system. In a traditional sysplex, an application request is received by the LFS, and the LFS forwards the request to the PFS which owns the corresponding file system to obtain the requested data. PFS owns the file system while the file server owns the export. When PFS is sysplex-aware, PFS performs the forwarding itself, obtaining data from a PFS cache, a remote PFS, or a storage device, if the data exists. As for the file server, when the request is from an application, a local glue (G2) routine or program communicates with an owning export glue (G1) routine or program to coordinate the application access. So in a sysplex-aware PFS, there can be one file server exporting all file systems across the sysplex regardless of who owns them. If there is more than one server running, they need to export different file systems. Additionally, with a sysplex-aware PFS, the concept of file system owner effectively disappears because the PFS supplies data from the cache regardless of who owns it. However, the remote clients still need to know who exported the file system and can only access the data exported by the local file server (i.e., the file server to which the remote client is connected). The token manager on each file server distributes tokens to allow access to data from the file server on behalf of remote clients or to allow access to PFS data by the LFS. The token manager uses tokens to manage access to data and metadata. The tokens guarantee that applications are provided with the most recent version of the data and that multiple applications are not accessing the same data in a conflicting manner.

As for remote clients, when a remote client wishes to access or change a file or directory that is managed by the file exporter, a file server to which the remote client is connected obtains tokens on behalf of the remote client as needed for a given operation. The file server may request the appropriate tokens for the data from the token manager. The token manager's response to the request depends on the data the client wants to manipulate, the operation the client wants to perform on the data, and whether any other clients currently have tokens for the data. If neither the LFS nor other clients have tokens for the data, the token manager can issue the remote client the appropriate tokens. If outstanding tokens for the data exist, the token manager can grant the request (if no conflicts arise between the request and the outstanding tokens), revoke the existing tokens to grant the request, or consider the request pending until it can grant it. In some cases, the token manager simply refuses to grant the request. If the token manager gives the client the necessary tokens, the client in turn can access the data from the file exporter in the manner requested.

In current distributed computing environments, remote clients can only access file systems on the system owning the export. For example, in a traditional sysplex, a file server only exports the file systems owned by the sysplex that the file server is running on, i.e., the file system to which it has direct access. As a result, remote clients need to know which logical partition (LPAR) owns the export for the file system before connecting to a network drive. This is because file servers do not communicate with each other and therefore cannot coordinate a plurality of remote clients accessing the same file or files. Moreover, in situations where a file system has been exported by another file server, the remote clients cannot access files across mount points of the file system.

In order to provide remote clients with access to exported file systems, a system administrator can set up a single file server with all exports or multiple file servers with different exports. For the single file server, remote clients can access exported file systems by connecting to that single system. This approach is adequate until the system goes down, whereupon all access to exported file systems is lost. For multiple client servers, a remote client needs to know which system owns the exported file system because, if the system owning the exported file system is down, the remote client will not be able to access this file system.

In view of the foregoing considerations, there is a need to improve remote client access to exported file systems in distributed computing environments.

SUMMARY

In a distributed computing environment, methods, computer program products, and systems provide remote clients with access to remotely exported file systems by using a remote token manager to provide communications among a plurality of caching file servers. In response to a client request for file system access, a program is invoked to determine whether the request relates to a locally exported file system exported by a local caching file server or a remotely exported file system exported by a remote caching file server. If the request relates to a locally exported file system, a local token manager is invoked to obtain a token granting access permission to the locally exported file system. If the request relates to a remotely exported file system, a remote token manager is invoked to communicate with a local access routine in the remote caching file server to obtain a token granting access permission for the remotely exported file system. Using at least one of the local token manager or the remote token manager, remote clients in the distributed computing environment can access any exported file system in the distributed computing environment.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION

Figure 1:
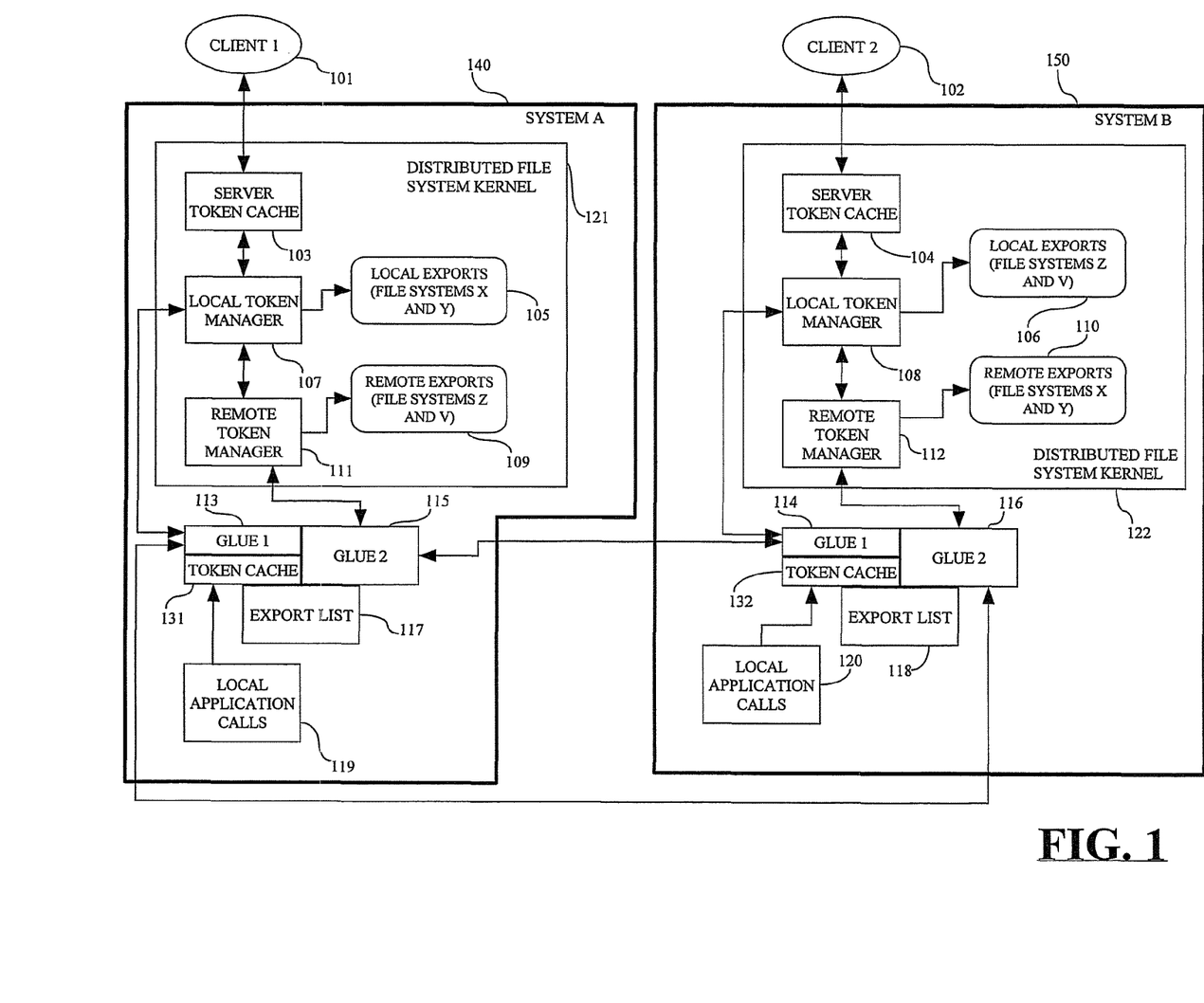
FIG. 1 illustrates a system for coordinating access to locally and remotely exported file systems according to an exemplary embodiment.

FIG. 1 illustrates an exemplary system for coordinating access to locally and remotely exported file systems. The system of FIG. 1 includes a first sysplex member denoted as system A 140 and a second sysplex member denoted as system B 150. System A 140 and system B 150 together comprise an illustrative sysplex, it being understood that a sysplex may include a number of systems in addition to system A 140 and system B 150. Illustratively, system A 140 and system B 150 are each capable of functioning as a. Distributed File Service Server Message Block (SMB) server. This SMB server functionality is implemented using a distributed file system kernel 121 for system A 140 and a distributed file system kernel 122 for system B 150. System A 140 and system B 150 may, but need not, be implemented using IBM z/OS systems.

System A 140 and system B 150 are each capable of functioning as caching file servers for exporting sysplex-aware physical file systems (PFS's) regardless of ownership while, at the same time, coordinating local access from any sysplex member. This functionality is achieved using one or more remote token managers to provide communications among a plurality of caching file servers. The PFS's are "sysplex aware" in the sense that they communicate with each other to obtain data for one or more logical file systems (LFS's). In this type of system, an LFS asks a local PFS for data, and the PFS obtains the data from its cache, remote PFS, or storage device, if the data exists.

In the example of FIG. 1, system A 140 is provided with a remote token manager 111, and system B 150 is also provided with a remote token manager 112. System A 140 is capable of accessing files on local exports 105 including file systems X and Y, and is also capable of accessing files on remote exports 109 comprising file systems Z and V. Similarly, system B 150 is capable of accessing files on local exports 106 including file systems Z and V, and is also capable of accessing files on remote exports 110 comprising file systems X and Y.

Each member of a sysplex, such as system A 140 and system B 150, is provided with two glue (G) routines. For example, system A 140 is provided with a first glue routine denoted as glue 1 (G1) 113 and a second glue routine denoted as glue 2 (G2) 115. Similarly, system B 150 is provided with a first glue routine denoted as glue 1 (G1) 114 and a second glue routine denoted as glue 2 (G2) 116. G1 113 and G1 114 may each be conceptualized as local access routines, whereas G2 115 and G2 116 may each be conceptualized as remote access routines. G1 113 and G2 115 may, but need not, be provided in the form of a program module loaded into system A 140 upon registration of the file server of system A 140. Likewise, G1 114 and G2 116 may, but need not, be provided in the form of a program module loaded into system B 150 upon registration of the file server of system B 150. Alternatively, G1 113 and G2 115 may be loaded as separate modules, or G1 114 and G2 116 may be loaded as separate modules, or G1 113, G1 114, G2 115 and G2 116 may all be loaded as separate modules.

G1 113 and 115 may each be substantially similar to the glue (G) program described previously in the Background section, and are illustratively invoked by a logical file system (LFS) capable of accessing a locally exported file system. G2 114 and 116 may each represent a new routine that is loaded onto a sysplex member. G2 114 or G2 116, respectively, may be invoked by the LFS before and after every vnode operation on a corresponding sysplex member such as system A 140 or system B 150, if that sysplex member does not own the exported file system, i.e., if that sysplex member does not have the file system exported. G2 115 is capable of communicating with G1 114 of system B 150 wherein system B 150 represents a file server that owns the exported file system (i.e., has the file system exported), to coordinate the access across the sysplex. Similarly, G2 116 is capable of communicating with G1 113 of system A 150 wherein system A 150 represents a file server that owns the exported file system, so as to coordinate access across the sysplex. Accordingly, G1 113, 114, and G2 115, 116 allow a single file exporter to export all sysplex-aware file systems.

G1 113 or G1 114 may be invoked by an LFS to coordinate obtaining and revoking tokens for granting access permissions to a locally exported file system. G2 115 or G2 116 provide a mechanism for obtaining access to a remotely exported file system. G1 113 and G2 115 of system A 140 keep track of one or more exports in the sysplex and the identity (or identities) of the system (or systems) owning the export (or exports) using an export list 117. Similarly, G1 114 and G2 116 of system B 150 keep track of one or more exports in the sysplex and the identity (or identities) of the system (or systems) owning the export (or exports) using an export list 118. Export list 117 and export list 118 may each be implemented as a single local and remote export list. Alternatively, export list 117 may be implemented using a first list for local exports and a second list for remote exports, wherein the first list is separate from the second list. Similarly, export list 118 may also be implemented using one list for local exports and another list for remote exports.

Illustratively, existing LFS code for invoking G1 113, 114, respectively, can be updated to use G2 115, 116, respectively, upon receipt of a request for a remotely owned file system. The existing LFS sysplex communication can be used for G2 115 in a first sysplex member (system A 140) to communicate with G1 114 in a second sysplex member (system B 150) having a file server running to obtain access permissions to a remotely exported file system. According to an exemplary embodiment, G1 113 and G2 116, as well as G1 114 and G2 115, communicate via a Cross System Coupling Facility (XCF). Pre/post operations enable the LFS to acquire appropriate permissions for file system access. The pre operation requests permission for access, and the post operation releases the access, i.e., permits the appropriate G routines of G1 113, G1 114, G2 115, and G2 116 to know that the LFS is no longer accessing the file system.

System A 140 is operatively coupled to a first remote client depicted as a client 1 101. Similarly, system B 150 is operatively coupled to a second remote client depicted as a client 2 102. Client 1 101 may, but need not, be connected to system A 140 via a TCP/IP connection. Similarly, client 2 102 may, but need not, be connected to system B 150 via a TCI/IP connection. While only two remote clients are shown for simplicity of illustration, it should be appreciated that any number of remote clients may be connected to system A 140 and system B 150. System A 140 and system B 150 may supply the remote clients with access to data stored and cached in their respective PFS's.

Applications may access the file systems in one or more of system A 140 and system B via one or more application calls. For example, system A 140 receives local application calls 119 at a token cache 131 operatively coupled to G1 113. Similarly, system B 150 receives local application calls 120 at a token cache 132 operatively coupled to G1 114. If an application requests to access a file system, the LFS in the sysplex member containing that application (such as system A 140) will invoke G1 113.

For each of one or more remote clients, a sysplex member creates a respective host object to represent a corresponding remote client. The respective host object is stored in a server token cache as a server token cache host object. For example, system A 140 creates a host object for client 1 101 and stores the host object for client 1 101 in a server token cache 103 operatively coupled to a local token manager 107. Similarly, system B 150 creates a host object for client 2 102 and stores the host object for client 2 102 in a server token cache 104 operatively coupled to a local token manager.

In cases where an application or a client requests access to a file system, local token manager 107 or 108 is employed to determine whether the request is for a locally exported file system or a remotely exported file system. For example, if client 1 101 requests access to a file system, local token manager 107 of system A 140 determines whether the request is for a locally exported fine system or a remotely exported file system. Likewise, if client 2 102 requests access to a file system, local token manager 108 of system B 150 determines whether the request is for a locally exported fine system or a remotely exported file system.

Assume that a request for file system access is received from client 1 101. If the request is for a file system that is exported locally, G1 113 will communicate with the distributed file system kernel 121 in that sysplex member to generate tokens, revoke tokens or deny tokens, as appropriate. G1 113 in the file server owning the file system knows if there has been access to the file system and knows if there is a conflicting request. If there is a conflicting request, G1 113 can revoke the existing token and issue a new one to allow access, refuse to provide a token, or hold the request pending. Once the token is obtained, the LFS retrieves the data from the PFS on the local system and returns it to the requesting application. As long as the LFS holds the token, the SMB will know not to use the cached data to satisfy a remote client's request for the same file.

If the request is for a remotely exported file system, and if this is a first request for access, local token manager 107 sends the request, along with a server token cache host object identifier for client 1 101, to a remote token manager 111. Remote token manager 111 calls G2 115 to request a token for the server token cache host object. G32 115 forwards the request for access to G1 114 in the sysplex member owning the remotely exported file system (i.e., system B 150). The request may include a GetToken message and a server token cache host object identifier. According to an exemplary embodiment, G2 115 and 116 may be invoked in each sysplex member before and after every vnode operation on the sysplex members not owning the export to keep any cached data up to date. When G1 114 in the sysplex member owning the remotely exported file system receives the request for access, token cache 132 operatively coupled to G1 114 creates a new remote host object for the remote client or for local application call 119. Token cache 132 then sends the new remote host object to a local token manager 108 of system B 150. On subsequent requests for access to the remotely exported file system, local token manager 108 may already possess the remote host object identifier. Accordingly, on such subsequent requests, a check is performed to ascertain whether or not the remote host object identifier exists and, if so, whether or not the remote host object identifier needs to be updated. If the remote host object identifier is present, a new remote host object identifier does not need to be created.

Local token manager 108 processes the new remote host object by granting a token containing a token identifier. The token grants access permissions to the remotely exported file system for client 1 101, or for a call received at local application calls 119. The granted token is sent from G1 114 of system B 150 to G2 115 of system A 140 to a remote token manager 111 of system A 140 to a local token manager 107 of system A 140 to a server token cache 103 of system A 140. Local token manager 108 of system B 150 maintains a table of all granted tokens, as will be described in greater detail hereinafter with reference to FIGS. 3A-3D. The granted token allows data within the PFS to be retrieved and returned to the requesting application via the Cross System Coupling Facility (XCF). The token is held by a glue routine (for example, G2 115) on behalf of the LFS of the file server owning the remote export (in the present example, system B 150). As long as the glue routine holds the token for LFS, the SMB server in that sysplex member will know not to use the cached data to satisfy a remote client's request for the same file.

Although the foregoing example considers a request received from client 1 101 at system A 140, the principles described above are also applicable in situations where a request is received from client 2 102 at system B 150. For example, whereas system A 140 includes local token manager 107 and remote token manager 111, system B 150 includes local token manager 108 as well as a remote token manager 112. Remote token manager 112 is capable of implementing the operations discussed above in connection with remote token manager 111, wherein these operations are to be performed at system B 150. Likewise, local token manager 108 is capable of implementing the operations discussed above in connection with local token manager 107, wherein these operations are to be performed at system B 150.

Figure 2:
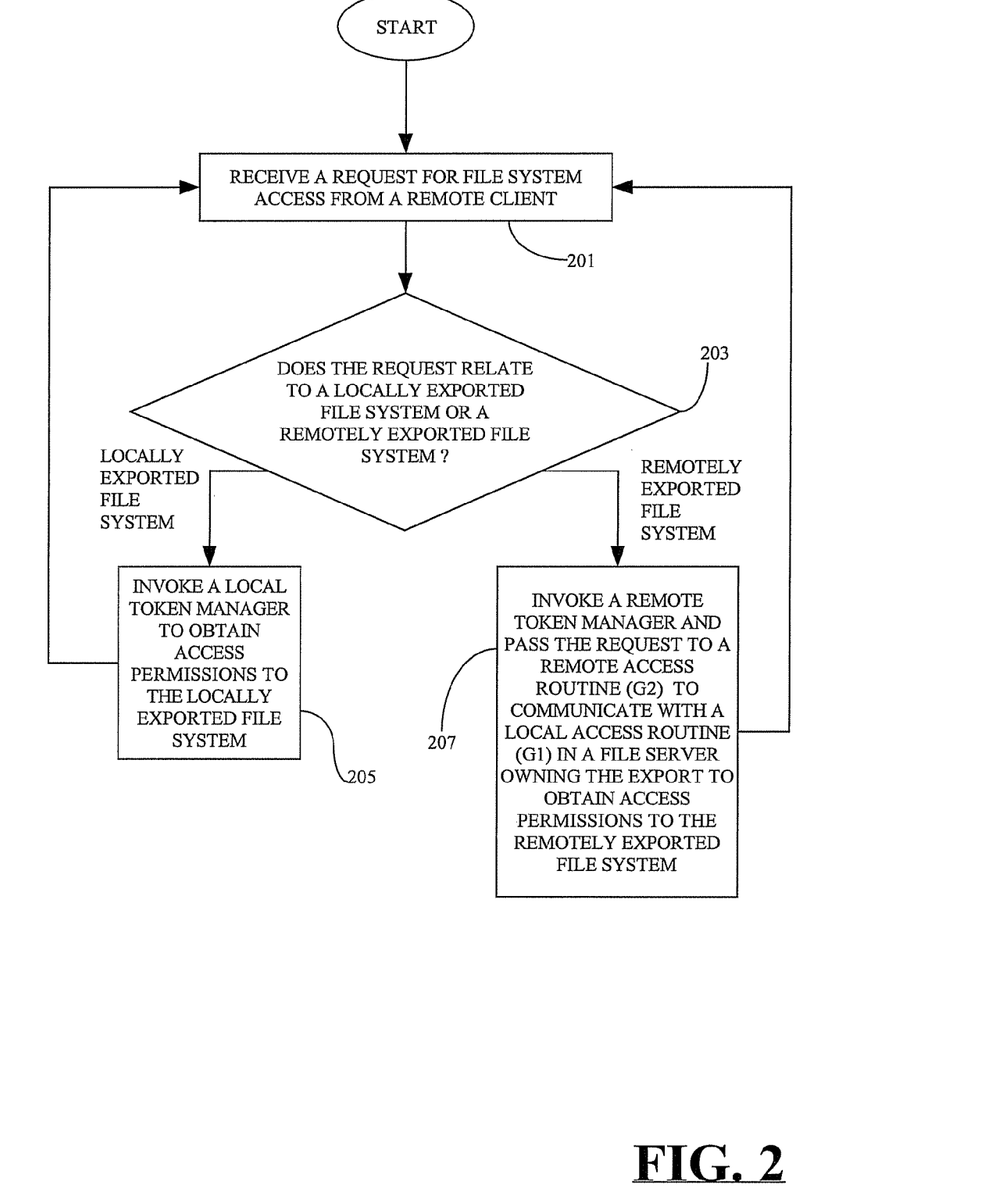
FIG. 2 illustrates a first method for coordinating access to locally and remotely exported file systems according to an exemplary embodiment.

FIG. 2 illustrates a first method for coordinating access to locally and remotely exported file systems according to an exemplary embodiment. At block 201, a request for file system access is received from a remote client. Next, at block 203, a determination is made as to whether the request is for a locally exported file system or a remotely exported file system. The request may be generated by an application or received from a remote client. If it is determined that the request is for a locally exported file system, the procedure advances to block 205 where a local token manager is invoked to obtain access permissions to the locally exported file system. If it is determined that the request is for a remotely exported file system at block 203, then the procedure advances to block 207 where a remote token manager is invoked which passes the request to a remote access routine (G2 115 or G2 116, FIG. 1) to communicate with a local access routine (G1 113 or G1 114) in the file server owning the export to obtain access to the remotely exported file system.

Figure 3A:
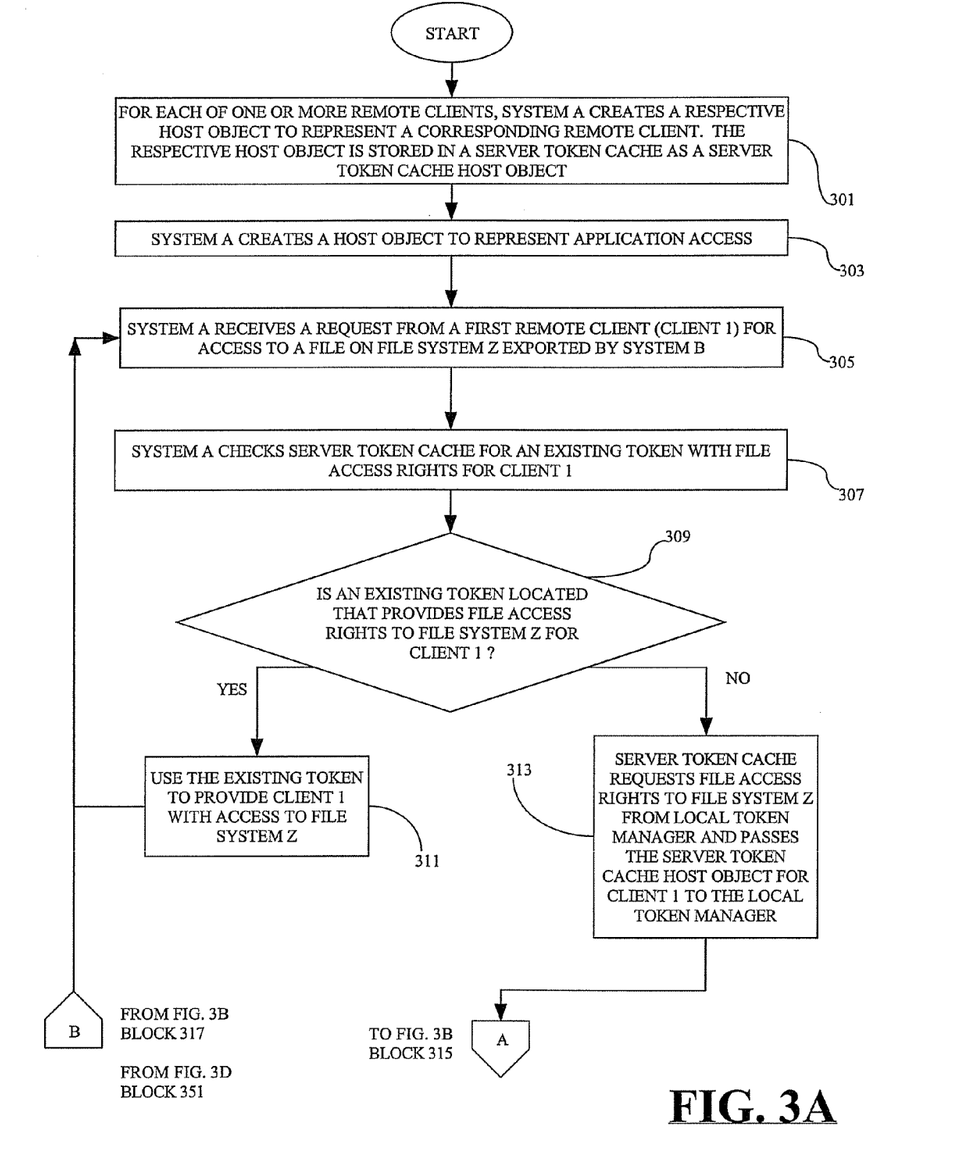
FIGS. 3A-3D illustrate a second method for coordinating access to locally and remotely exported file systems according to an exemplary embodiment.
Figure 3B:
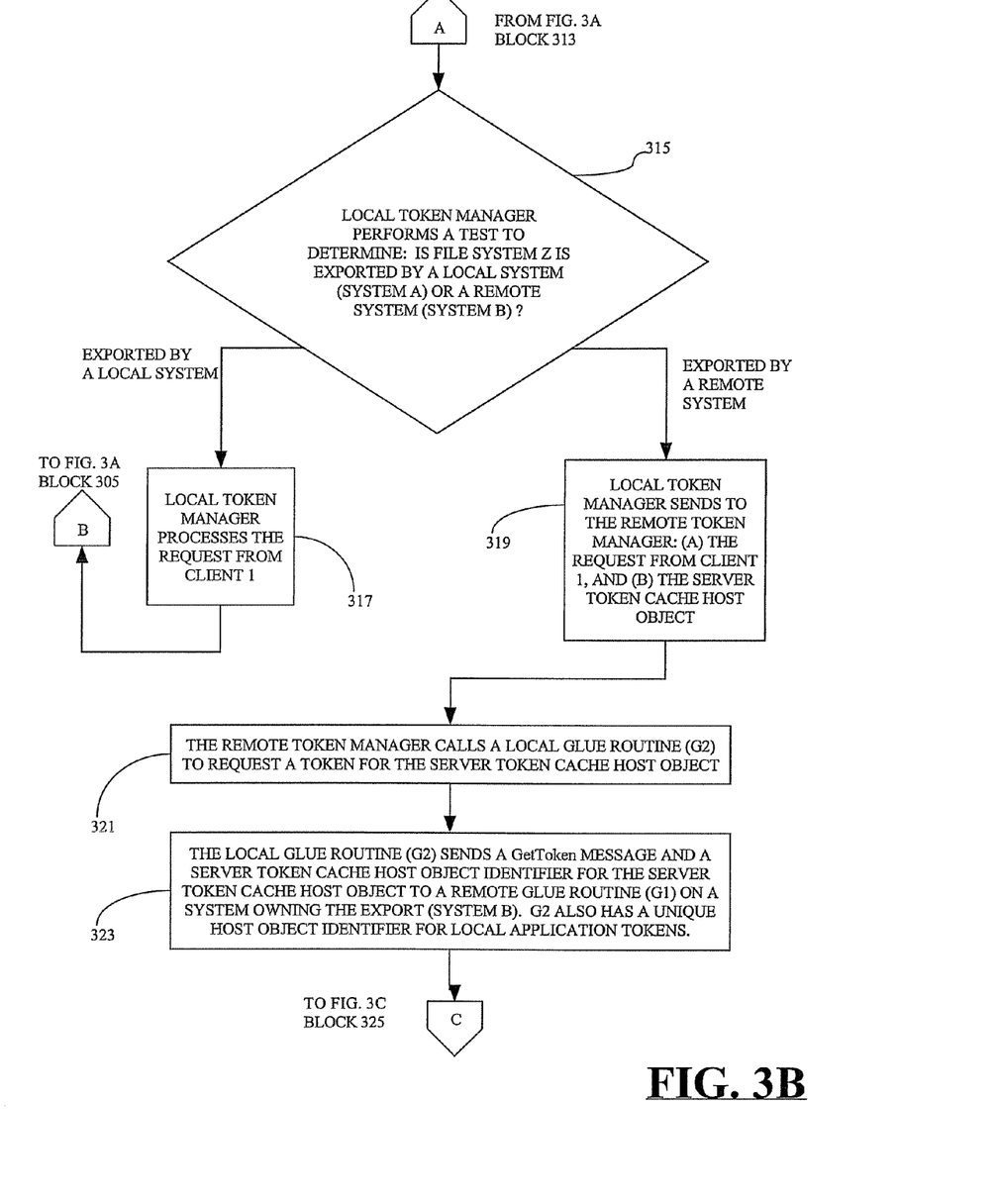
Figure 3C:
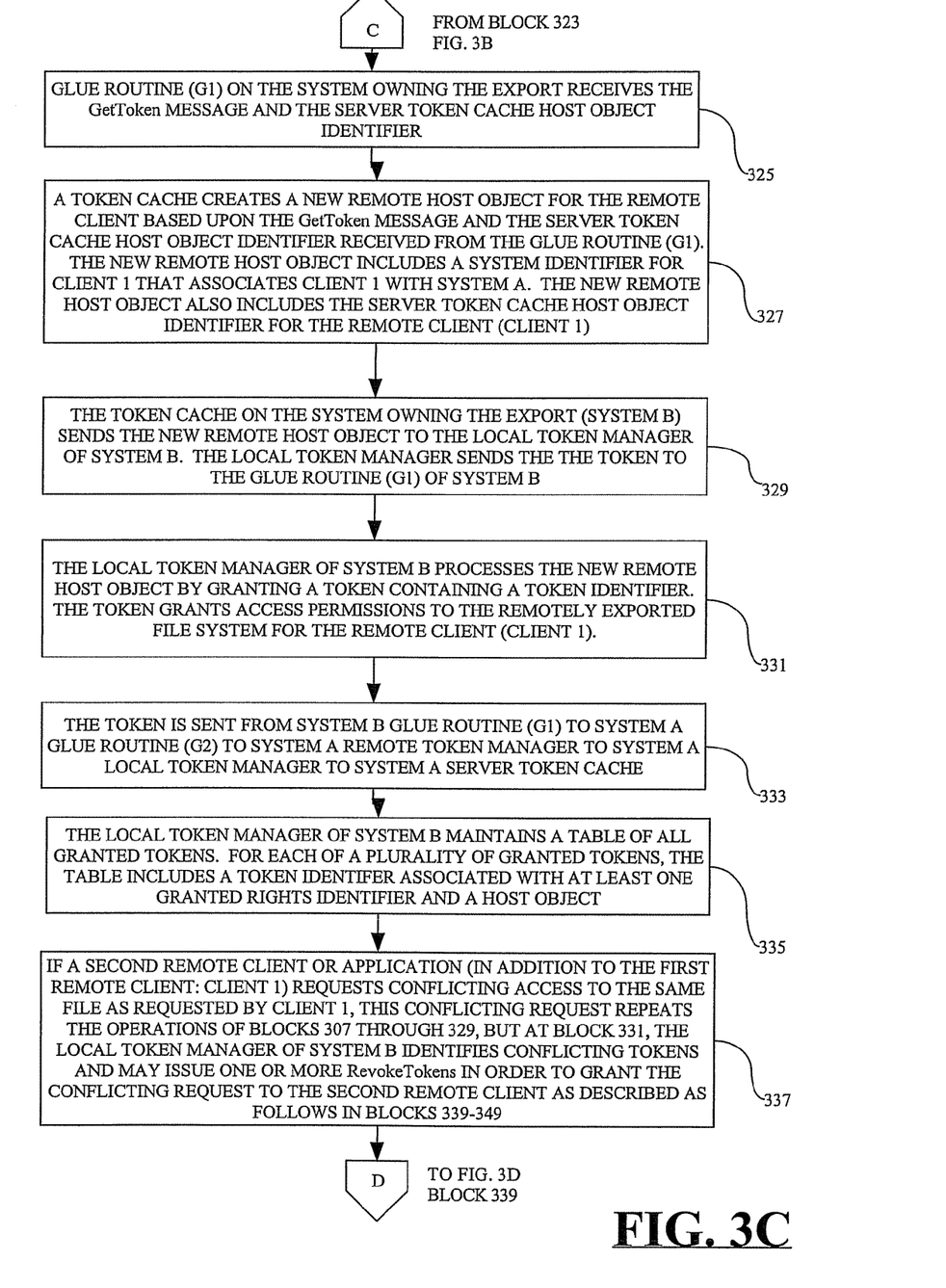

FIGS. 3A-3D illustrate a second method for coordinating access to locally and remotely exported file systems according to an exemplary embodiment. The procedure commences at block 301 (FIG. 3A) where, for each of one or more remote clients such as client 1 101 (FIG. 1), system A 140 creates a respective host object to represent a corresponding remote client. The respective host object is stored in server token cache 103 as a server token cache host object. At block 303 (FIG. 3A), system A 140 (FIG. 1) creates a host object to represent application access. Next, at block 305 (FIG. 3A), system A 140 (FIG. 1) receives a request from a first remote client (such as client 1 101) for access to a file on file system Z exported by system B 150. System A 140 checks server token cache 103 for an existing token with file access rights for client 1 101 (FIG. 3A, block 307).

At block 309, a test is performed to ascertain whether or not an existing token is located that provides file access rights to file system Z for client 1 101 (FIG. 1). If so, the procedure progresses to block 311 (FIG. 3A), where the existing token is used to provide client 1 101 (FIG. 1) with access to file system Z. The procedure then loops back to block 305 (FIG. 3A). The negative branch from block 309 leads to block 313 where server token cache 103 (FIG. 1) requests file access rights to file system Z from local token manager 107 and passes the server token cache host object for client 1 101 to local token manager 107. At block 315 (FIG. 3B), local token manager 107 (FIG. 1) performs a test to determine if file system Z is exported by a local system (system A 140) as opposed to file system Z being exported by a remote system (system B 150). If file system Z is exported by a local system, local token manager 107 processes the request from client 1 101 (FIG. 3B, block 317), and the procedure loops back to block 305 (FIG. 3A).

If file system Z is exported by a remote system as determined at block 315 (FIG. 3B), then the procedure advances to block 319 where local token manager 107 (FIG. 1) sends the request from client 1 101 to remote token manager 111. Local token manager 107 also sends the server token cache host object for client 1 101 to remote token manager 111. Next, at block 321 (FIG. 3B), remote token manager 111 (FIG. 1) calls a local glue routine (G2 115) to request a token for the server token cache host object. At block 323 (FIG. 3B), the local glue routine sends a GetToken message and a server token cache host object identifier for the server token cache host object to a remote glue routine (G1 114, FIG. 1) on a system owning the export (i.e., system B 150). G2 115 also has a unique host object identifier for local application tokens.

The procedure of FIGS. 3A-3D advances to block 325 (FIG. 3C) where a glue routine (G1 114, FIG. 1) on the system owning the export (system B 150) receives the GetToken message and the server token cache host object identifier. At block 327 (FIG. 3C), token cache 132 (FIG. 1) on system B 140 creates a new remote host object for the remote client (client 1 101) based upon the GetToken message and the server token cache host object identifier for the server token cache host object received by G1 114. The new remote host object includes a system identifier for the remote client (client 1 101) that associates the remote client with the system receiving the request from the remote client (in the present example, system A 140). The new remote host object also includes the server token cache host object identifier for the remote client.

At block 329 (FIG. 3C), token cache 132 (FIG. 1) of system B 150 sends the new remote host object to local token manager 108 of system B 150. Next (block 331, FIG. 3C), local token manager 108 (FIG. 1) processes the new remote host object by granting a token containing a token identifier. The token grants access permissions to the remotely exported file system for the remote client (client 1 101). Local token manager 108 sends the token to glue routine G1 114 of system B 150. At block 333 (FIG. 3C), the token is sent from glue routine G1 114 (FIG. 1) to glue routine G2 115 of system A. Glue routine G2 115 sends the token to remote token manager 111 of system A 140. Remote token manager 111 sends the token to local token manager 107 of system A 140. Local token manager 107 sends the token to server token cache 103 of system A 140.

Figure 3D:
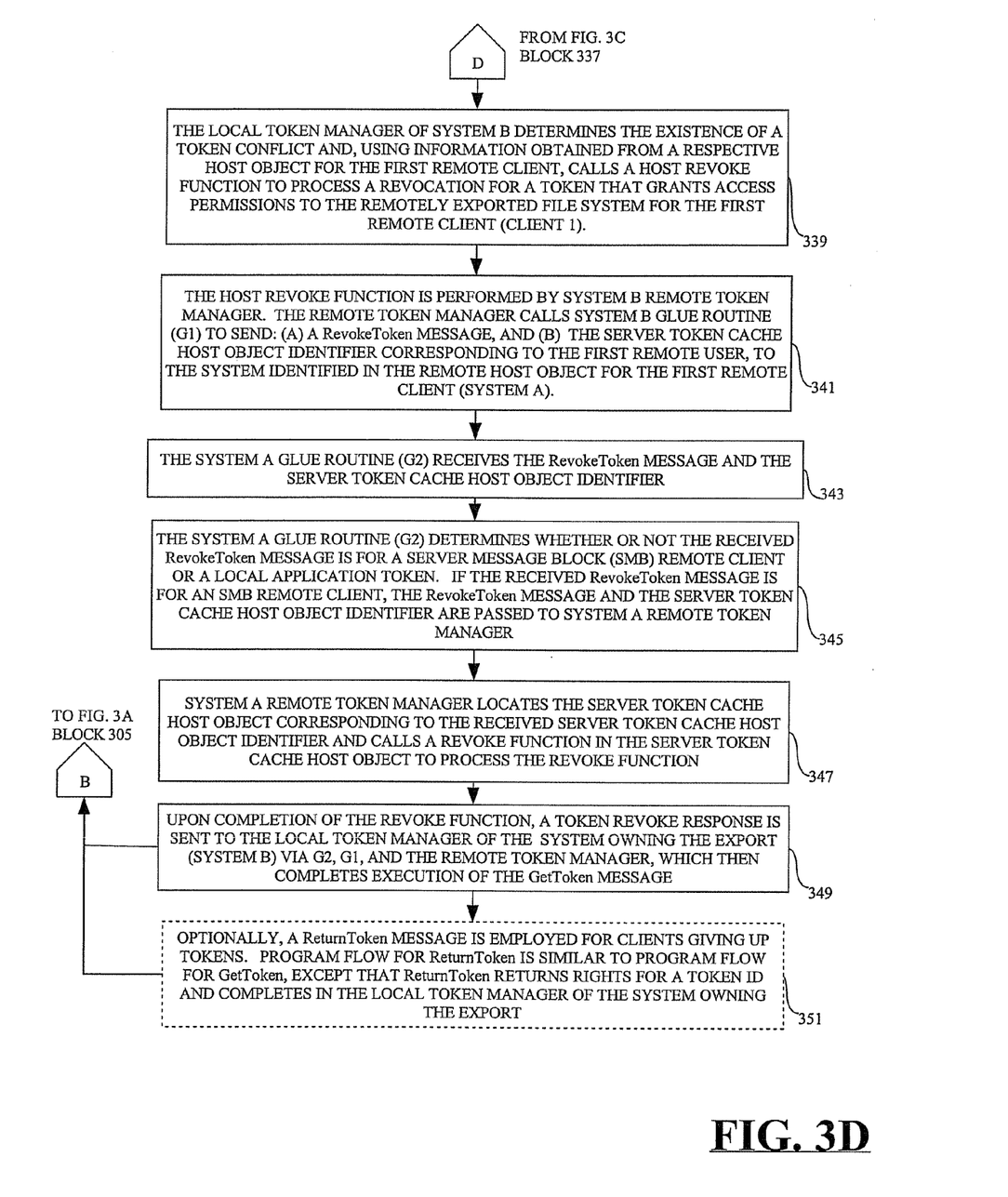

The procedure of FIGS. 3A-3D progresses to block 335 (FIG. 3C) where local token manager 108 (FIG. 1) of system B 150 maintains a table of all granted tokens. For each of a plurality of granted tokens, the table includes a token identifier associated with at least one granted rights identifier and a host object. Next, at block 337 (FIG. 3C), if a second remote client or application in addition to the first remote client (client 1 101, FIG. 1) requests conflicting access to the same file as requested by client 1 101, this conflicting request repeats the operations of blocks 307 through 329 (FIGS. 3A-3C), but at block 331 (FIG. 3C), local token manager 108 (FIG. 1) of system B 150 identifies conflicting tokens and may issue one or more RevokeTokens in order to grant the conflicting request to the second remote client as described as follows with reference to blocks 339-349 (FIG. 3D).

At block 339 (FIG. 3D), local token manager 108 (FIG. 1) determines the existence of a token conflict. Using information obtained from a respective host object for the first remote client (client 1 101), local token manager 108 calls a host revoke function to process a revocation for a previously granted token that grants access permissions to the remotely exported file system for the first remote client. Next, at block 341 (FIG. 3D), the host revoke function is performed by remote token manager 112 (FIG. 1) of system B 150. Remote token manager 112 calls glue routine G1 114 of system B 150 to send: (a) a RevokeToken message, and (b) the server token cache host object identifier corresponding to the first remote user; to the system identified in the remote host object for the first remote client (i.e., system A 140).

The process of FIG. 3D proceeds to block 343 where glue routine G2 115 (FIG. 1) of system A 140 receives the RevokeToken message and the server token cache host object identifier. At block 345 (FIG. 3D), glue routine G2 115 (FIG. 1) determines whether or not the received RevokeToken message is for an SMB remote client or for a local application token. If the received RevokeToken message is for an SMB remote client, then the RevokeToken message and the server token cache host object identifier are passed to remote token manager 111 of system A 140. Next, at block 347 (FIG. 3D), remote token manager 111 (FIG. 1) locates the server token cache host object corresponding to the received server token cache host object identifier and calls a revoke function in the server token cache host object to process the revoke function. The procedure of FIG. 3D advances to block 349 where, upon completion of the revoke function, a token revoke response is sent to the local token manager of the system owning the export (in this example, local token manager 108 (FIG. 1) of system B 150) via G2 115 and G1 114. The procedure then loops back to block 305 (FIG. 3A).

Optionally, after block 349 (FIG. 3D) is performed, the operations of block 351 may be performed. At block 351, a ReturnToken message is employed for clients giving up tokens. Program flow for ReturnToken is similar to program flow for GetToken (described previously), except that ReturnToken returns rights for a token identifier and completes in the local token manager of the system owning the export.

The procedure of FIGS. 3A-3D may be employed by a caching file server in a distributed computing environment to grant tokens for managing multiple local and remote access to exported file systems. This procedure may be employed in conjunction with a plurality of file servers, each of which caches file system data. Moreover, a plurality of file servers may be utilized to export the same file system or systems throughout a distributed computing environment. Accordingly, the procedure of FIGS. 3A-3D enables remote clients in a distributed computing environment to access any exported file system on any system in a sysplex regardless of ownership. Remote clients can also access files across mount points regardless of which system in a sysplex was the first to export the file. A plurality of file servers can be employed to export a given file system or systems such that, upon one or more servers of the plurality of file servers failing, remote clients can continue to access the given file system.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing remote client access to an exported file system in a distributed computing environment, the method comprising:
   in response to a request from a remote client for file system access, determining whether the request relates to a locally exported file system exported by a local caching file server or a remotely exported file system exported by a remote caching file server;
   if the request relates to the locally exported file system, invoking a local token manager at the local caching file server to obtain a token granting access permission to the locally exported file system; or
   if the request relates to the remotely exported file system, passing the request from the local token manager to a remote token manager of the local caching file server and invoking the remote token manager to communicate with a local access routine in the remote caching file server, through a remote access routine in the local caching file server, to obtain a token granting access permission for the remotely exported file system exported by the remote caching file server.
   wherein the remote token manager only communicates with the local access routine in the remote caching file server using the remote access routine in the local caching file server.

2. The method of claim 1 wherein the remotely exported file system is exported by a plurality of remote caching file servers.

3. The method of claim 2 further including accessing the remotely exported file system when one of the plurality of remote caching file servers is not functioning.

4. The method of claim 1 further including accessing the remotely exported file system across one or more mount points.

5. The method of claim 1 further comprising caching data for the remotely exported file system and updating the cached data when the remotely exported file system changes.

6. A computer program product for providing remote client access to an exported file system in a distributed computing environment, the computer program product comprising a non-transitory computer readable storage medium for storing instructions which, when executed on a computer, causes the computer to perform a method comprising:

in response to a request from a remote client for file system access, determining whether the request relates to a locally exported file system exported by a local caching file server or a remotely exported file system exported by a remote caching file server; if the request relates to the locally exported file system, invoking a local token manager at the local caching file server to obtain a token granting access permission to the locally exported file system; or if the request relates to the remotely exported file system, passing the request from the local token manager to a remote token manager of the local caching file server and invoking the remote token manager to communicate with a local access routine in the remote caching file server, through a remote access routine in the local caching file server, to obtain a token granting access permission for the remotely exported file system exported by the remote caching file server.

wherein the remote token manager of the local caching file server only communicates with the local access routine in the remote caching file server.

7. The computer program product of claim 6 wherein the remotely exported file system is exported by a plurality of remote caching file servers.

8. The non-transitory computer readable storage medium of claim 7 further including instructions for accessing the remotely exported file system when one of the plurality of remote caching file servers is not functioning.

9. The non-transitory computer readable storage medium of claim 6 further including instructions for accessing the remotely exported file system across one or more mount points.

10. The non-transitory computer readable storage medium of claim 6 further comprising instructions for caching data for the remotely exported file system and updating the cached data when the remotely exported file system changes.

11. An apparatus for providing remote client access to an exported file system in a distributed computing environment, the apparatus comprising:

a processor configured to provide:

a processing mechanism for determining whether a request received from a remote client for file system access relates to a locally exported file system exported by a local caching file server or a remotely exported file system exported by a remote caching file server, a local token manager at the local caching file server, operatively coupled to the processing mechanism, for obtaining a token granting access permission to the locally exported file system, and a remote token manager at the local caching file server, operatively coupled to the processing mechanism, for receiving requests to access the remotely exported file system through the local token manager and for communicating with a local access routine in the remote caching file server, through a remote access routine in the local caching file server, to obtain a token granting access permission for the remotely exported file system exported by the remote caching file server.

wherein the remote token manager only communicates with the local access routine in the remote caching file server using the remote access routine in the local caching file server.

12. The apparatus of claim 11 wherein the remotely exported file system is exported by a plurality of remote caching file servers.

13. The apparatus of claim 12 further comprising a data cache, operatively coupled to the processing mechanism, for caching data for the remotely exported file system and updating the cached data when the remotely exported file system changes.

* * * * *